2,804,432
Patented Aug. 27, 1957

2,804,432

PROCESS OF MAKING PARTICLES OF CAUSTIC SODA AND CAUSTIC POTASH IMPREGNATED WITH GLUCONIC ACID

Paul W. Bonewitz, George S. Edwards, and Elmer H. Fults, Burlington, and Sebern W. Hockett, Mount Pleasant, Iowa No Drawing. Application January 12, 1950,
Serial No. 138,261

11 Claims. (Cl. 252—156)

This invention relates to the manufacture of compounds containing gluconic acid and caustic, such as alkali metal hydroxides, notably caustic soda and caustic potash.

We have found that highly effective cleaning materials and water treatment materials as particles, e. g. as globules, granules or of irregular shape can be prepared by agitating a mixture of aqueous caustic solution and aqueous gluconic acid solution while cooling the same in equipment such as a "Dopp" kettle or equivalent mixing and treating apparatus, wherein the mixture is not only agitated, but worked and sheared during the cooling. The particles are of various small sizes, ranging from powder up to as much as ½ inch or more in diameter. These particles are hard, non-adherent, and contain the caustic as the principal constituent, the caustic being impregnated with the gluconic acid, and gluconic acid also being present either as a complete coating but usually as a partial coating on the outside of the particles.

Products of this character form very effective cleaning compounds in water for cleaning food containers and food processing equipment and for metal cleaning, as well as other purposes. Also, these products are highly useful in the treatment of hard-water. The particles containing an appreciable amount of unreacted gluconic acid occluded therein, as well as on the surface, are highly useful to sequester or chelate hard-water salts in aqueous solution and regardless of the temperature of the water.

The caustic products moreover have an important characteristic, namely, substantial freedom from carbonates, which makes the product highly effective for the purposes mentioned above.

In preparing the particles, the gluconic acid in concentration of 25% to 75% in aqueous solution, preferably 50%, is mixed with a hot super-saturated aqueous solution of the caustic, usually 60% to 78% concentration, having a temperature from above the freezing point of the caustic, e. g. from about 160° F. to 250° F. The two solutions are mixed by agitation and this agitation includes working the solution mixture and exerting a shearing action. During this mixing and working and shearing, the mixture is constantly cooled to keep the temperature always below about 250° F. and preferably below about 175° F. and to reduce the temperature of the mass to a point where it will congeal, i. e. freeze or solidify. In this mixing and cooling operation, the mixture passes from the liquid state through a mushy stage and then into a solid state, breaking up into particles of globular, or even irregular forms, dependent upon the equipment. The mixture begins to freeze or congeal at about 120° F. to 145° F. and the finally solid particles are usually removed from the equipment, ready for screening and packaging, at a temperature of about 70° F. to 110° F.

The critical factors of this invention are the concomitant cooling while the mass is being agitated, worked and sheared to reduce it from the liquid state to the solid state and form it into hard particles of caustic containing occluded unreacted gluconic acid, as well as either a complete coating of the latter or partial coating of the unreacted gluconic acid. At no time is the temperature of the mixture permitted to reach a point at which the caustic will pyrolyze the gluconic acid and thereby destroy the effectiveness of the same. That is, temperatures above 175° for more than a brief period, must be avoided and preferably the temperature is maintained initially not greater than about 160° F., the process having as an essential step the continuous cooling of the mixture in liquid state from such high temperatures to reduce it to a temperature in the neighborhood of 100° F. during the mixing, working and shearing. The granules or globules or irregular particles can be cooled down to room temperature in the mixing equipment but this usually is unnecessary, and they are, for practical purposes, generally removed when they have a temperature of about 70 to 110° for screening and packaging, and allowed to thereafter cool further to room temperature, if necessary.

In carrying out the process of this invention, the amount of free water present at any time is so small as to preclude appreciable ionization of the caustic and gluconic acid so that no appreciable reaction between these two compounds will occur, other than lactone formation due to the dehydrating action of the caustic.

Example I 188 pounds of hot liquid aqueous caustic soda solution (75% concentration) having a temperature of about 160° F. is introduced into a jacketed "Dopp" kettle equipped with proper agitators and to this is added 12 pounds of aqueous gluconic acid solution (50% concentration) at room temperature and the two solutions are mixed with agitation, including working and shearing. The cooling jacket is started when the gluconic acid is added, to prevent temperature rise above 175° F. Cooling of the mixture is continued by circulating cold water through the jacket while agitating the mass and working and shearing it. At an approximate temperature of about 140 to 145° F., the mixture will begin to freeze or congeal, passing through a viscous, mushy stage and then breaking up into particles as the temperature is further reduced to about 70–110° F.

The finished product will resemble small globules or granules and contain the mixture, namely caustic impregnated with gluconic acid in a solid non-adherent form. The particles have a yellow surface cast in some cases, indicating the presence of a coating of gluconic acid. The globules are then drawn off, screened and packaged.

Example II

In Example II equipment similar to that described in Example I is utilized. 20 pounds of the globular or granular finished product described in Example I are placed in the "Dopp" kettle as "seed" particles. In a separate holding tank 188 pounds of the hot liquid 75% aqueous caustic soda solution at 160° F. are mixed with 12 pounds of the aqueous gluconic acid solution of 50% concentration, having a temperature of about 70° F., and the temperature of this mixture is held at about 160° F. The liquid mixture of gluconic acid and caustic is pumped through spray heads at the top of the "Dopp" kettle and on to the solid globular or granular product in the kettle while being agitated, worked and sheared. Cold water is continuously circulated through the jacket of the kettle as in Example I and the heat of the sprayed mixture is removed as the liquid material passes through the several stages and builds upon the cooled globules or granules in the kettle. This operation is continued as in Example I, i. e. until all of the liquid mixture of gluconic acid and caustic soda in the holding tank has been sprayed into the kettle, agitated, worked and sheared, formed into globules or granules and cooled to a temperature of about 100° F., at which time the material is removed, screened and packaged.

In preparing the globules or granules or particles, about 1 to 11 pounds of gluconic acid solution are mixed with each 100 pounds of caustic.

The impregnated caustic particles show reduced hydroscopicity and, as indicated above, lack to a marked extent the characteristic property of caustic soda of drawing carbon dioxide from the air.

The particles impregnated with gluconic acid or having gluconic acid occluded therein as well as coated on the surfaces thereof, are useful to sequester or chelate hard-water salts and for this purpose, are used in amount of about 1/10 of 1% to 10% of the water by weight.

*Example III*

While we have mentioned above particles of relatively small dimensions, caustic products impregnated with or having occluded therein unreacted gluconic acid may be embodied in relatively large sized lumps or cakes. For instance, to a container or drum of aqueous caustic soda solution having from 70 to 75% caustic concentration and a temperature above the freezing point to about 200° F., there is added from about 1 to 11 pounds of aqueous gluconic acid solution, preferably of 50% concentration, per 100 pounds of caustic solution. This mixture is then agitated to uniformly distribute the gluconic acid while keeping the mixture cooled to prevent the caustic from deteriorating the gluconic acid. After the gluconic acid has been distributed through the caustic, agitation of the liquid mixture is discontinued and the cooling continued to 120° to 145° F. to produce a solidified block or cylinder of caustic having the gluconic acid occluded therein. Such blocks may be the size of an ordinary shipping drum, in fact, they may be of any size desired.

The large solidified product of Example III may be ground and screened to produce any desired particle size and shape of caustic product impregnated with gluconic acid and having some of the gluconic acid at the surface of the particles.

While we have described above equipment such as a "Dopp" kettle and which we consider preferable for the making of particle products such as granules and globules, it is to be understood that the operation of the invention is not limited to any particular types of equipment. Ordinary mixing equipment of which there are many different types available, may be equally well utilized.

Furthermore, instead of cooling jackets associated with the mixing equipment, other cooling means may be utilized as by directing cold air to the surface of the mixing vessel. In this connection the provision of cooling means is to speed up the operation and substantially equally satisfactory results may be obtained although in a longer time by simply allowing the mixing operation to take place with ordinary atmospheric air cooling. In the case of Example III, no positive cooling means are required, the gluconic acid and caustic solution being simply intimately mixed in any suitable tank or container then removed from the mixing vessel by pouring into any suitable form, and allowing to cool and solidify in atmospheric air.

In referring to "build-up" in the seeding operation of Example II, this means that the original seed particles are caused to grow by reason of contact with the solution mixture which solidifies on the seed particles with cooling and mixing and in turn these larger particles are broken up and provide additional seeds for growth.

*Example IV*

In this example, the procedures described in connection with Examples I and II are utilized but the introduction of the gluconic acid in Example I and the introduction of the solution mixture in Example II is continuous and the particles are continuously formed and discharged or otherwise removed from the mixing equipment.

*Example V*

In this example, a solution mixture such as described in Example II is prepared using aqueous caustic solution having a caustic concentration of about 70 to 78% and the mixture is maintained at about 160° to 175° F. This mixture will include gluconic acid as described above, in amount of about 1 to 11 pounds for each 100 pounds of the caustic solution.

The caustic solution is supplied to the surface of a relatively slowly rotating drum cooling wheel, the surface of which is cooled to a temperature of about 20° to 70° F. In any suitable manner, drums of this type being of course well known and commonly referred to as a flaking wheel. The mixture is applied to the surface of the drum preferably by letting the wheel run partially immersed in the solution mixture whereby it picks up a film of the same which by reason of the low temperature of the surface of the wheel is immediately cooled and can be removed either as a thin solid sheet and broken up or can be flaked off of the roll as solid flakes as desired. This product is composed of caustic having occluded therein gluconic acid and gluconic acid will also be present on the surface of the sheet and flakes as removed from the cooling drum.

As with all the products obtained in accordance with this invention, the small amount of water present precludes appreciable ionization of the gluconic acid and caustic and the product exhibits the desirable properties of being substantially devoid of carbonates.

The congealing or freezing of the solution (which is maintained at at least about 160° F. but below a temperature such as would destroy the effectiveness of the gluconic acid, viz., not greater than about 200° F.), is prevented at all times by circulating the solution mixture in the pan through which the cooling wheel travels to pick up the film of solution mixture.

While it is believed that about 1 to 11 pounds of aqueous gluconic acid solution to each 100 pounds caustic will be all that is required for most purposes, there are instances where up to 20 to 25 pounds per 100 pounds of the aqueous gluconic acid solution are used to each 100 pounds caustic.

The products prepared in accordance with this invention will chelate hard-water salts in alkali solutions, according to our present understanding of what takes place. That is to say, because of the immediate availability of the gluconic acid for reaction with hard-water salts, such salts are rapidly sequestered in the presence of the caustic by what appears to be chelate ring formation, which is believed to take place on the carbon atoms of the sugar acid chain, particularly the carboxyl group (COOH) and the delta and gamma (CHOH) groups. Chelate ring structures being in resonance, contribute to the enhanced stability of the hard-water salt chelated structures, which in turn are very much more soluble in the presence of caustic than other types of the metal salts or compounds.

While we have referred only to gluconic acid herein, and this is preferred because of its commercial availability, other sugar acids have evidenced similar properties as substitutes for and in conjunction with gluconic acid in thus producing chelate compounds in caustic solutions.

For example, pentonic acids, saccharic acids and saccharinic acids have indicated a usefulness, and particularly when used in conjunction with gluconic acid.

We claim:

1. The process of making particles of caustic selected from the group consisting of caustic soda and caustic potash impregnated with gluconic acid comprising adding gluconic acid in aqueous solution to a hot super-saturated aqueous solution of the caustic, mixing the two solutions together while cooling the mixture until solid non-adherent particles are formed, the amount of free water present at any time precluding appreciable ionization of the caustic and gluconic acid.

2. The process of claim 1 wherein the particles are cooled to about 70° to 110° F. for packaging.

3. The process of claim 1 wherein the aqueous solution of caustic has a temperature from above the freezing point of the caustic to not greater than about 175° F.

4. The process of claim 1 wherein the temperature of the operation is not greater than above about 250° F. at any time.

5. The process which comprises mixing seed particles of caustic selected from the group consisting of caustic soda and caustic potash impregnated with gluconic acid with a hot solution mixture of aqueous gluconic acid solution and super-saturated aqueous solution of the caustic, the solution mixture having a temperature above the freezing point of the mixture, cooling the particles and solution mixture while mixing the same, the particles increasing in size during the mixing by the freezing thereon of the solution mixture, and breaking down the particles into smaller particles while continuing cooling the mixture until all of the solution mixture added is converted to solid non-adherent particles, the amount of free water present at any time precluding ionization of the constituents.

6. The process of claim 5 wherein the solution mixture is sprayed into the mass of seed particles and the mixture thereof with the solution while the mixing and cooling continues.

7. The process of claim 5 wherein the solution mixture is continuously supplied and the particles are continuously discharged from the mixture.

8. The process of claim 5 wherein the solution is sprayed into the mass of seed particles and the mixture thereof with the solution while the mixing and cooling operations continue and wherein the solution mixture is continuously supplied and the particles are continuously discharged from the mixture.

9. The process of claim 5 wherein about 1 to 11 pounds of gluconic acid solution is mixed with about each 100 pounds of aqueous caustic solution.

10. The process which comprises mixing an aqueous solution of caustic selected from the group consisting of caustic soda and caustic potash having 60 to 78% concentration with 1 to 11 pounds of an aqueous solution of gluconic acid of a concentration of 25 to 75% to each 100 pounds of the caustic, maintaining the mixture solution fluid, forming a film of such solution mixture on a cold surface having a temperature low enough to freeze the film thereon, and recovering the film as a caustic product impregnated and coated with the gluconic acid.

11. The process which comprises mixing an aqueous solution of caustic selected from the group consisting of caustic soda and caustic potash having a concentration of 60 to 78% caustic with 1 to 11 pounds aqueous gluconic acid solution of a concentration of 25 to 75% per 100 pounds of the caustic solution and thereafter solidifying the mixture as a mass of caustic having the gluconic acid occluded therein.

References Cited in the file of this patent

UNITED STATES PATENTS

| | | |
|---|---|---|
| 2,046,192 | Snell et al. | June 30, 1936 |
| 2,584,017 | Dvorkovitz et al. | Jan. 29, 1952 |

FOREIGN PATENTS

| | | |
|---|---|---|
| 885,521 | France | May 31, 1943 |

OTHER REFERENCES

Condensed Chemical Dictionary, Reinhold Pub. Co., N. Y., 3rd ed. (1942), pages 584 and 325.